UNITED STATES PATENT OFFICE 3,597,435
Patented Aug. 3, 1971

3,597,435
SUBSTITUTED PHENOXYMETHYLDIOXOLANES
William J. Houlihan, Mountain Lakes, N.J., assignor to
Sandoz-Wander, Inc., Hanover, N.J.
No Drawing. Filed Apr. 28, 1969, Ser. No. 819,955
Int. Cl. C07d 31/28
U.S. Cl. 260—297R
6 Claims

ABSTRACT OF THE DISCLOSURE

Substituted phenoxymethyldioxolanes, e.g., 2-(4-nitrophenyl) - 4 - (4 - chlorophenoxymethyl)-1,3-dioxolane, useful as tranquilizers.

---

This invention relates to substituted phenoxymethyldioxolanes. More particularly, it relates to 2-substituted [4-(phenoxymethyl)dioxolanes, acid addition salts thereof and processes for their preparation.

The substituted phenoxymethyldioxolanes of this invention may be represented by the following structural formula:

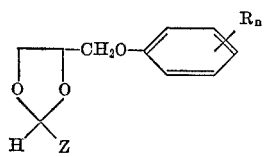

wherein Z is

e.g. pyridyl(2,3 or 4),

where X is S or O, e.g. thienyl (2 or 3), furyl (2 or 3), or

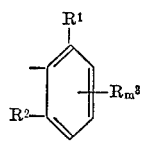

R, $R^1$ and $R^2$ are H, halo having an atomic weight of 19 to 36,
$R^3$ is H, halo having an atomic weight of 19 to 36, nitro or phenyl,
$n$ is 1 or 2, and
$m$ is 1, 2 or 3, provided (1) there are no adjacent nitro or phenyl groups, and
(2) at most three of $R^1$, $R^2$ and $R^3$ are other than hydrogen.

The process for preparing the compounds of Formula I may be represented by the following reaction scheme:

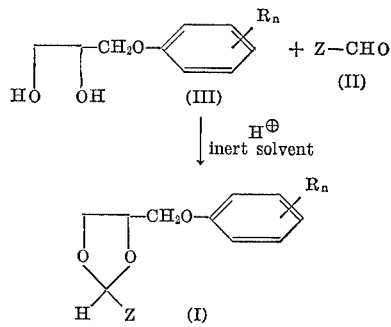

where R, $n$ and Z have the above-stated significance.

Compound (I) is prepared by treating a substituted phenoxy-1,2-propanediol (III) with a compound of Formula II in an inert solvent such as benzene, toluene, xylene, chlorobenzene, heptane, octane and the like, for about 1 to 8 hours, preferably 1 to 4 hours at a temperature of from about 60° to 150° C., preferably at the reflux temperature of the solvent, in the presence of a mineral acid or an organic acid preferably in an non-aqueous form, which is inert to the reactants. Among the acids which may be used are acids such as p-toluene-sulfonic acid, hydrochloric acid and the like. Neither the temperature of the reaction, the time nor the solvent used is critical.

The compounds of Formula I where Z is pyridyl (2,3 or 4) may be prepared in acid addition salt form, such as the hydrochloride, by conventional methods, such as suspending the compound in alcohol or water and treating with the appropriate acid. When it is desired to convert such salts to the corresponding free bases, conventional techniques may be utilized e.g. dissolution of the salt in water and precipitation using a base such as sodium hydroxide.

The compounds of Formula I may be recovered using conventional recovery techniques such as crystallization.

Certain of the compounds of Formulas II and III are known and may be prepared according to methods disclosed in the literature. Those compounds of Formulas II and III not specifically disclosed are prepared according to analogous methods from known materials.

The compounds of Formula I can exist as a racemate or in an optically active form. The racemic form as well as the optical antipodes (enantiomers) are within the scope of this invention. Resolution of a racemate of a compound I can be effected by conventional means, e.g., the use of optically active acids. In some cases, greater pharmacological activity or other beneficial attributes may be found with respect to a particular geometric and/or optical isomer, and in such instances administration of such isomer may be preferred.

The compounds represented by Formula I are useful because they possess pharmaceutical properties in animals. In particular these compounds are useful as tranquilizers as indicated by their ability to antagonize amphetamine induced stimulation in mice, wherein the mice are each given 2.5 milligrams per kilogram of body weight of amphetamine sulfate and 25–200 milligrams per kilogram of the active agent. The locomotor activity of the mice is measured for an 80 minute period at 10 minute intervals with an Actophotometer (manufactured by Woodward Res. Corp., Herndon, Va.). The compounds (I) may be administered orally or parenterally and, depending upon the compound employed and the mode of administration, the exact dosage utilized may vary.

Furthermore, these compounds (I) may be similarly administered in the form of their non-toxic pharmaceutically acceptable acid addition salts. Such salts possess the same order of activity as the free base, are readily prepared by reacting the base with an appropriate acid and accordingly are included within the scope of the invention. Representative of such salts are the mineral acid salts, such as the hydrochloride, hydrobromide, sulfate, phosphate and the like and the organic acid salts, such as the succinate, benzoate, p-toluenesulfonate, benzenesulfonate and the like. In general, satisfactory results are obtained when these compounds are administered for the hypotensive use at a daily dosage of about 6 milligrams to about 200 milligrams per kilogram of animal body weight. This daily dosage is preferably administered in divided doses 2 to 4 times a day, or in sustained release form. For most large mammals such as primates, the total daily dosage is from about 400 milligrams to about 1000 milligrams. Dosage forms suitable for internal use comprise from about 100 milligrams to about 500 milligarms of the active compound in intimate admixture with a solid or liquid pharmaceutically acceptable carrier or diluent.

A representative formulation suitable for oral administration is a tablet prepared by standard tabletting techniques which contains the following:

| Ingredient: | Parts by weight |
| --- | --- |
| 2-(4-nitrophenyl)-4-(4-chlorophenoxymethyl)-methyl)-1,3-dioxolane | 50 |
| Tragacanth | 2 |
| Lactose | 39.5 |
| Corn starch | 5 |
| Talcum | 3 |
| Magnesium stearate | 0.5 |

The following examples are provided for the purpose of illustration and not by way of limitation. They are not intended so as to limit the scope of the invention as defined in the appended claims.

EXAMPLE 1

2-(4-nitrophenyl)-4-(4-chlorophenoxymethyl) 1,3-dioxolane

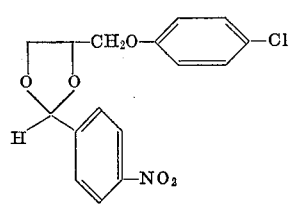

A mixture of 15.1 g. (0.10 mole) of 4-nitrobenzaldehyde, 20.3 g. (0.10 mole) of 3-(p-chlorophenoxy)-1,2-propanediol, 0.9 g. of p-toluenesulfonic acid and 500 ml. of toluene were stirred and refluxed in a flask equipped with a Dean-Stark tube until water failed to separate in the side-arm (ca. 2.5 hours). Removal of the solvent in vacuo gave an oil that crystallized to give 21 g. of an isomeric mixture of 2-(4-nitrophenyl)-4-(4-chlorophenoxymethyl)-1,3-dioxolane, M.P. 76–79° C. Crystallization from methanol gave isomer A, M.P. 94–96° C. Concentration of the mother liquor gave an oil that was crystallized from ethanol-heptane 1:4 to give isomer B, M.P. 74–76° C.

EXAMPLE 2

4-[4-(4-chlorophenoxymethyl)1,3-dioxolan-2-yl-]pyridine

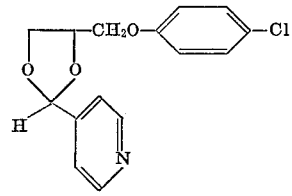

Following the procedure of Example 1 and starting with 10.1 g. of 3-(p-chlorophenoxy)-1,2-propanediol, 5.4 g. (0.05 mole) of 4-pyridinecarboxaldehyde, 0.2 g. p-toluenesulfonic acid and 250 ml. of toluene, there was obtained from diethylether, 6 g. of a 95:5 mixture of the A and B isomers respectively of 4-[4-(4-chlorophenoxymethyl-1,3-dioxolan-2-yl]pyridine, M.P. 66–91° C.

EXAMPLE 3

3-[4-(4-chlorophenoxymethyl)-1,3-dioxolan-2-yl] pyridine

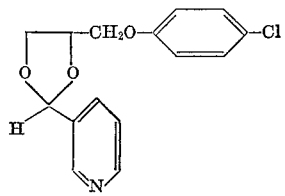

Following the procedure of Example 1 and starting with 20.3 g. of 3-(p-chlorophenoxy)-1,2-propanediol, 10.7 g. of 3-pyridinecarboxaldehyde, 0.9 g. of p-toluenesulfonic acid, and 250 ml. of toluene there was obtained 27 g. of a 55:45 mixture of the A and B isomers of 3-[4-chlorophenoxymethyl)-1,3-dioxolan - 2 - yl]pyridine as an oil, $n_D^{20}$ 1.5720.

EXAMPLE 4

2-[4-(4-chlorophenoxymethyl)-1,3-dioxolan-2-yl] pyridine

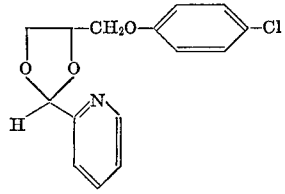

Following the procedure of Example 1 and starting with 20.3 g. (0.10 mole) 3 - (p-chlorophenoxy)-1,2-propanediol, 10.7 g. (0.10 mole) of 2-pyridinecarboxaldehyde, 0.9 g. of p-toluenesulfonic acid and 250 ml. of toluene, there was obtained from isopropanol 16.0 g. of a 55:45 mixture of the A and B isomers of 2-[4-(4-chlorophenoxymethyl)-1,3-dioxolan - 2 - yl]pyridine, as an oil, $n_D^{20}$ 1.5710.

EXAMPLE 5

2-(4'-biphenylyl)-4-(4-chlorophenoxymethyl)-1,3-dioxolane

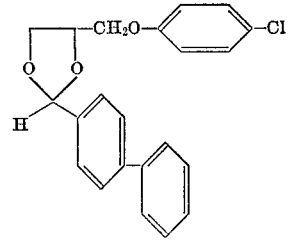

Following the procedure of Example 1 and starting with 10.1 g. (0.05 mole) of 3-(p-chlorophenoxy)-1,2-propanediol, 9.1 g. (0.05 mole) of 4-phenylbenzaldehyde, 0.2 g. of p-toluenesulfonic acid and 500 ml. of toluene, there was obtained from isopropanol, 11.4 g. of 2-(4'-biphenylyl)-4-(4-chlorophenoxymethyl)-1,3-dioxolane as a 55:45 mixture of isomers A and B, M.P. 95–96° C.

EXAMPLE 6

2-(2,6-dichlorophenyl)-3-(4-chlorophenoxymethyl)-1,3-dioxolane

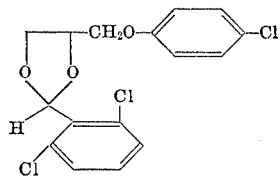

Following the procedure of Example 1 and starting with 10.1 g. of 3-(p-chlorophenoxy)-1,2-propanediol, 8.7 g. (0.05 mole) of 2,6-dichlorobenzaldehyde, 0.2 g. of p-toluenesulfonic acid, and 500 ml. of toluene, there was obtained from diethyl ether, 6.8 g. of 2-(2,6-dichloro)-4-(4-chlorophenoxymethyl)-1,3-dioxolane isomer A, M.P. 93–95° C.

EXAMPLE 7

Following the conditions of Example 1 and in place of 4-nitrobenzaldehyde, starting with (a) 2-thiophenecarboxaldehyde,
(b) 2-furancarboxaldehyde, the following products are obtained:

(a) 2-(2-thienyl)-4-(4-chlorophenoxymethyl)-1,3-dioxolane,
(b) 2-(2-furyl)-4-(4-chlorophenoxymethyl)-1,3-dioxolane.

What is claimed is:
1. A compound of the formula:

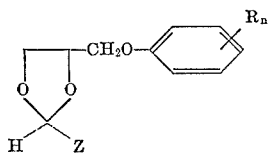

wherein

Z is

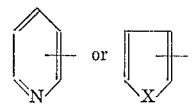

R is H, halo having an atomic weight of 19 to 36,
X is S or 0, and
$n$ is 1 or 2, or where Z is

a pharmaceutically acceptable acid addition salt thereof.

2. The compound according to claim 1 which is 4-[4-(4-chlorophenoxymethyl)-1,3-dioxolan - 2 - yl]pyridine or a pharmaceutically acceptable acid addition salt thereof.

3. The compound according to claim 1 which is 3-[4-(4-chlorophenoxymethyl)-1,3-dioxolane - 2 - yl]pyridine or a pharrmaceutically acceptable acid addition salt thereof.

4. The compound according to claim 1 which is 2-[4-(4-chlorophenoxymethyl)-1,3-dioxolan - 2 - yl]pyridine or a pharmaceutically acceptable acid addition salt there of.

5. The compound according to claim 1 which is 2-(2-furyl)-4-(4-chlorophenoxymethyl)-1,3-dioxolane.

6. The compound according to claim 1 which is 2-(2-thienyl)-4-(4-chlorophenoxymethyl)-1,3-dioxolane.

References Cited

UNITED STATES PATENTS 3,375,253    3/1968    Fields et al. _____ 260—340.9X
3,459,771    8/1969    Nikles et al. _____ 260—297X ALAN L. ROTMAN, Primary Examiner U.S. Cl. X.R.

260—332.3H, 340.9; 424—263, 275, 278